United States Patent Office 3,002,942
Patented Oct. 3, 1961

3,002,942
PIGMENTATION OF POLYESTERS
Gijsbertus Johannes Zoetbrood, Velp, Netherlands, assignor, by mesne assignments, to N.V. Onderzoekingsinstituut Research, Arnhem, Netherlands, a corporation of the Netherlands
No Drawing. Filed Oct. 6, 1958, Ser. No. 765,324
Claims priority, application Netherlands Oct. 19, 1957
2 Claims. (Cl. 260—22)

This invention relates to the preparation of pigmented polymeric substances. More particularly, the invention relates to a method for preparing pigmented polyesters from glycols of the series $HO(CH_2)_nOH$ where $n$ is an integer greater than 1 but not exceeding 10, and terephthalic acid or an esterforming derivative thereof such as alkyl terephthalates of 1–4 carbon atoms. If practice, the pigments in the form of a dispersion may be added to the reaction mass in any arbitrary stage of the preparation of the polymer.

The pigments, such as titanium dioxide, barium sulfate, aluminium oxide, or carbon black, may for example, be dispersed in water or in a glycol of the series $HO(CH_2)_nOH$, where $n$ is an integer greater than 1 but not exceeding 10.

It has been found, however, that the distribution of the pigments in the polyesters, prepared according to these known methods, is not homogeneous, especially in the case where carbon black is used as pigment.

It is an object of this invention to provide an improved process for preparing pigmented polyesters.

A method has now been found for preparing pigmented polyesters in which a very homogeneous distribution of the pigments in the polyesters is obtained.

In accordance with the present invention, preparation of the pigmented polymers is effected in the presence of one or more metallic soaps.

The total quantity of the metallic soaps applied preferably amounts to 0.005–0.3 mol. percent with respect to the terephthalic acid or an ester-forming derivative thereof in the reaction mass.

According to the invention, any type of metallic soap may be used for obtaining a homogeneous distribution of the pigments in the polyesters. Preferably, use is made of the aluminium-, calcium-, zinc-, lead-, manganese-, barium-, magnesium-, cadmium-, and antimony salts of higher fatty acids. Examples of the latter are aluminium naphthenate and aluminium stearate, calcium palmitate, zinc naphthenate and zinc stearate, lead montanate, manganese laurate, barium oleate, magnesium-, cadmium- and antimony stearate.

The metallic soaps used according to the invention have a point of decomposition above 250° C., so that they are not decomposed during the preparation of the polyesters which is effected at relatively high temperatures.

The metallic soaps or the mixtures of the metallic soaps may be added at any stage of the preparation of the pigmented polyesters. They may for instance be mixed with the initial reactants. However, they may also be added to the reaction mass before or during the esterinterchange or polycondensation process. Finally, they may also be mixed with the pigment dispersions.

The pigment dispersions may be prepared in any of the customary ways. The pigments may for instance be ball-milled with water or with glycols of the series $HO(CH_2)_nOH$, where $n$ is an integer greater than 1 but not exceeding 10, if desired in the presence of ionic dispersing agents such as sodiumdibutylnaphthalene sulfonate. If the pigment dispersions are prepared with the aid of glycols, use is preferably made of that glycol which serves as basic material for the preparation of the polyester concerned. Thus, in the preparation of a pigmented polyester from ethylene glycol and dimethyl terephthalate the pigment is preferably dispersed in ethylene glycol.

Threads, fibers and other shaped articles manufactured from the pigmented polyesters prepared according to the method of the invention, show a very homogeneous and fine distribution of the pigments.

The invention will be further illustrated by means of some examples.

*Example I*

In a vessel equipped with a high speed stirrer, 10 parts by weight of carbon black were mixed for three hours with 90 parts by weight of ethylene glycol and 0.04 part by weight of the ionic dispersing agent sodium-dibutyl-naphthalene sulfonate.

1000 parts by weight of dimethyl terephthalate, 700 parts by weight of ethylene glycol, 0.15 part by weight of zinc acetate, 0.40 part by weight of antimony trioxide and 0.3 part by weight of zinc distearate were heated in a vessel under atmospheric pressure while stirring. The temperature was gradually increased to 210° C. During this ester-interchange, methanol was distilled off. Thereafter the dispersion of carbon black was added to the reaction mass. Finally, the temperature was increased to 280° C. and kept at that value for three hours. At the same time the pressure was gradually reduced to 0.2 mm. Hg. During the polycondensation, ethylene glycol was distilled off.

The polyester thus prepared was extruded into a ribbon of 2 mm. thickness and the ribbon was processed to chips. From the chips, staple fibers were spun in the known way.

The staple fibers had a deep black color and the carbon black was distributed homogeneously, while conglomerates of the carbon black did not occur.

For comparison, a polyester pigmented with carbon black was prepared in the same way, but while omitting zinc distearate in the reaction mixture. Staple fibers manufactured from this polyester had a brownish black color, and the carbon black was not distributed homogeneously.

*Example II*

In a vessel, 10 parts by weight of carbon black and 0.05 part by weight of copper phthalocyanine were mixed for three hours with 80 parts by weight of ethylene glycol. 0.5 part by weight of the ionic dispersing agent sodiumdibutylnaphthalene sulfonate and 0.2 part by weight of aluminium naphthenate.

1000 parts by weight of dimethyl terephthalate, 700 parts by weight of ethylene glycol, 0.15 part by weight of zinc acetate and 0.40 part by weight of antimony trioxide were heated in a vessel at atmospheric pressure while stirring. The temperature was gradually increased to 210° C. During this ester-interchange, methanol was distilled off. Thereafter, the dispersion of carbon black and copper phthalocyanine was added to the reaction mass. The temperature was then increased to 280° C. and kept at that value for three hours, while at the same time the pressure was gradually decreased to 0.2 mm. Hg. During the polycondensation, ethylene glycol was distilled off.

From the polyester thus prepared staple fibers were manufactured. The staple fibers had a deep black color and the carbon black was distributed homogeneously.

*Example III*

In a vessel equipped with a high speed stirrer, 10 parts by weight of carbon black and 0.05 part by weight of copper phthalocyanine were mixed for four hours with 150 parts by weight of ethylene glycol, 0.05 part by weight of zinc acetate, 0.40 part by weight of antimony trioxide and 0.5 part by weight of calcium palmitate.

In a vessel, 1000 parts by weight of dimethyl terephthalate and 550 parts by weight of ethylene glycol were mixed with the above described dispersion of carbon black and copper phthalocyanine. While stirring, the mixture was heated at atmospheric pressure, the temperature being gradually increased to 210° C. During this ester-interchange, methanol was distilled off. Thereupon the temperature of the reaction product of the ester-interchange was increased to 280° C. and this temperature was maintained for three hours. At the same time the pressure was gradually reduced to 0.2 mm. Hg, while ethylene glycol was distilled off.

Staple fibers manufactured from the pigmented polyester thus prepared had a deep black color and the carbon black was distributed homogeneously.

*Example IV*

In a vessel equipped with a high speed stirrer, 5 parts by weight of titanium dioxide were mixed for three hours with 80 parts by weight of ethylene glycol and 0.05 part by weight of aluminium distearate.

1000 parts by weight of dimethyl terephthalate, 700 parts by weight of ethylene glycol, 0.15 part by weight of zinc acetate and 0.20 part by weight of antimony trioxide were heated in a vessel at atmospheric pressure while stirring. The temperature of the reaction mass was gradually increased to 210° C., while methylalcohol was distilled off. Thereupon the dispersion of titanium dioxide was added to the reaction mass. The temperature was then increased to 280° C. and kept at that value for three hours, while at the same time the pressure was gradually decreased to 0.2 mm. Hg and ethylene glycol was distilled off.

Staple fibers, manufactured from the polyester thus prepared showed a homogeneous distribution of the titanium dioxide.

What is claimed is:

1. In a method of preparing pigmented polyesters by reacting a glycol of the series $HO(CH_2)_nOH$ wherein $n$ is an integer greater than 1 but not exceeding 10, and a compound of the group consisting of terephthalic acid and an alkyl terephthalate of 1–4 carbon atoms, the improvement comprising incorporating a pigment in the form of a dispersion in the reaction mass in the presence of a small amount of zinc stearate.

2. In a method of preparing pigmented polyesters by reacting a glycol of the series $HO(CH_2)_nOH$ wherein $n$ is an integer greater than 1 but not exceeding 10, and a compound of the group consisting of terephthalic acid and an alkyl terephthalate of 1–4 carbon atoms, the improvement comprising incorporating a pigment in the form of a dispersion in the reaction mass in the presence of a small amount of calcium palmitate.

References Cited in the file of this patent

UNITED STATES PATENTS

| | | |
|---|---|---|
| 2,647,885 | Billica | Aug. 4, 1953 |
| 2,681,360 | Vodonik | June 15, 1954 |
| 2,877,126 | Whitby | Mar. 10, 1959 |
| 2,877,130 | Caron et al. | Mar. 10, 1959 |